United States Patent

[11] 3,547,082

[72] Inventor Louis Dewey Blessin, George John Hallman, Rockford, Ill.
[21] Appl. No. 739,052
[22] Filed June 21, 1968
[45] Patented Dec. 15, 1970
[73] Assignee H. D. Hudson Manufacturing Company Chicago, Ill. a corporation of Minnesota

[54] LIVESTOCK FEEDER
10 Claims, 6 Drawing Figs.
[52] U.S. Cl. ............................................. 119/53
[51] Int. Cl. ....................................... A01k 05/00
[50] Field of Search .......................................... 119/53- —54; 119/53, 53.5, 52

[56] References Cited
UNITED STATES PATENTS

| | | | |
|---|---|---|---|
| 1,167,385 | 1/1916 | Clough | 119/53.5 |
| 1,468,205 | 9/1923 | Julian | 119/53 |
| 2,352,859 | 7/1944 | Palmer | 119/54 |
| 2,593,879 | 4/1952 | Harry | 119/53 |
| 3,405,684 | 10/1968 | Ott | 119/53 |

Primary Examiner—Hugh R. Chamblee
Attorney—Kane, Dalsimer, Kane, Sullivan and Kurucz ABSTRACT: An improved livestock feeder includes a sled for rendering the feeder mobile, a detachable roof to permit easy access to the interior for cleaning, a feed hatch which can be operated from a remote location, and a canopy to permit the animals to feed unattended in a sheltered position from a trough which is continuously supplied with feed from the interior.

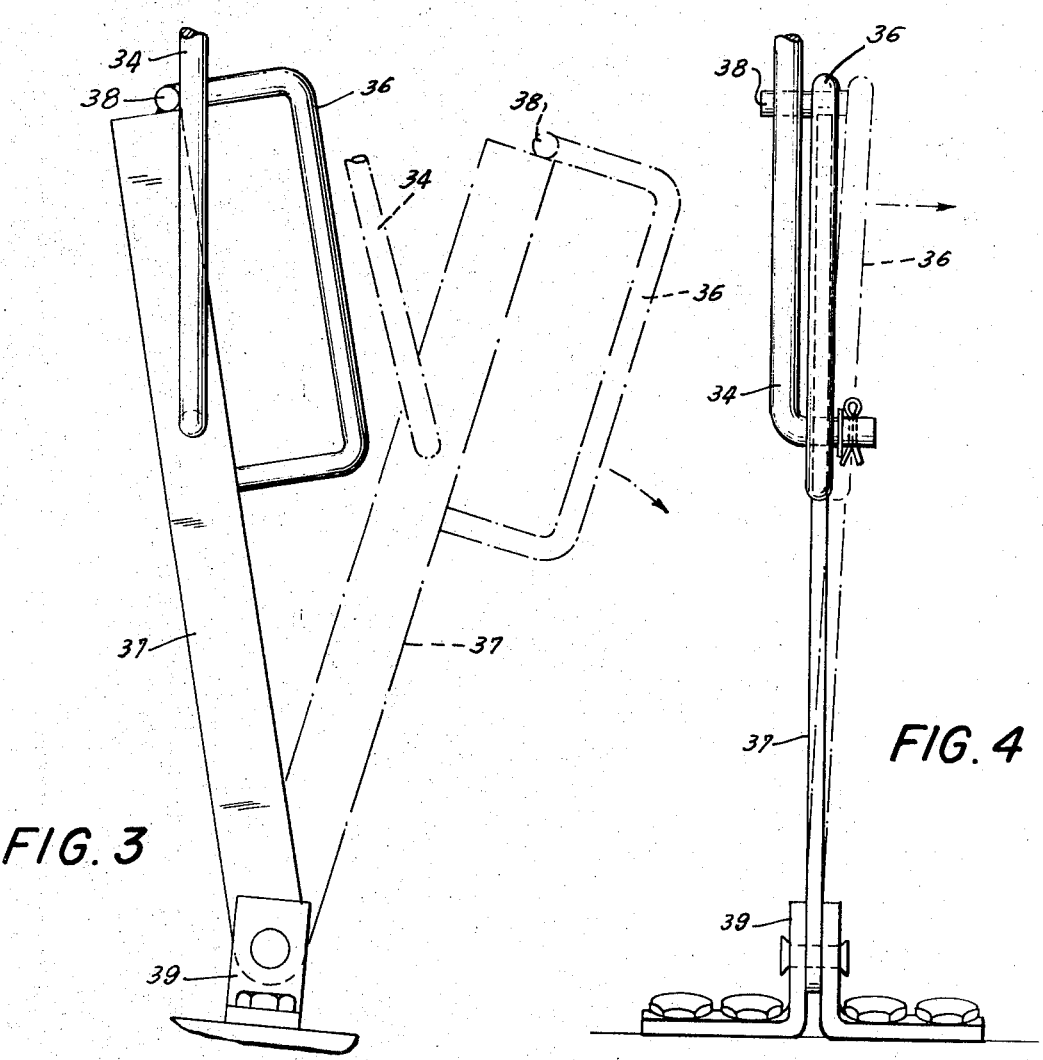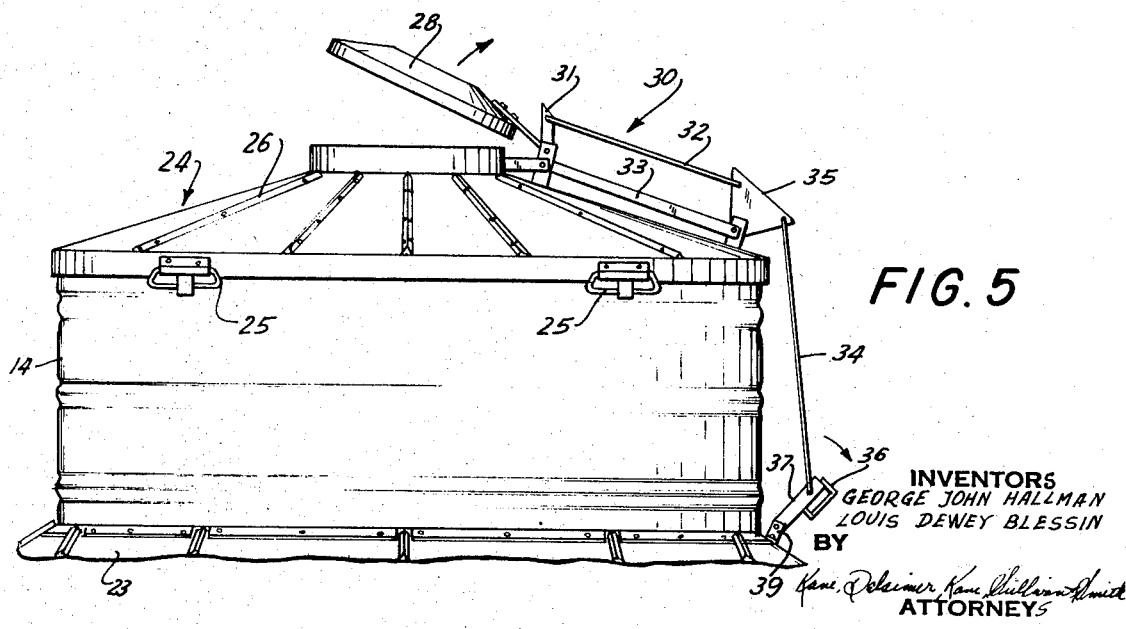

3,547,082

LIVESTOCK FEEDER

BACKGROUND OF THE INVENTION

This invention relates to a livestock feeder and more particularly to a mobile feeder for use by cattle and other farm animals.

Many varieties of cattle feeders are in use on farms and ranches which permit the animals to be fed from a central location. On large ranches it is often necessary to provide several feeders to accommodate animals located throughout the range. Servicing these feeders is difficult since feed must frequently be transported over substantial distances. In addition, cleaning of the feeders and replenishing the feed is often inconvenient due to construction and the difficulty in disassembly.

Although many attempts were made to overcome the foregoing and other difficulties, none, as far as we are aware, was entirely satisfactory when carried into practice commercially.

BRIEF SUMMARY

We have now developed an improved mobile livestock feeder capable of feeding a large number of cattle in a minimum of space and which can be replenished with feed through a remotely controlled hatch. The feeder's construction provides for easy cleaning and maintenance and protects the cattle and feed from rain, wind, moisture and other elements.

It is an object of this invention to provide a feeder which permits easy access to the interior for replenishing the feed through a remotely controlled hatch.

Another object of this invention is to provide a feeder which permits more cattle to be raised on smaller acreage.

A further object of this invention is to provide a feeder which can easily be moved from place to place to feed a large number of cattle.

Still another object of this invention contemplates a feeder provided with means for protecting the livestock and feed from the elements.

An additional object of this invention is to provide a feeder which can be easily disassembled to facilitate cleaning and maintenance.

Other object and advantages will become apparent from the following description taken in conjunction with the accompanying drawings in which:

FIG. 3 is a side elevation view of the locking assembly for securing the hatch cover showing the locked position in full line and the open position in phantom;

FIG. 4 is a front elevation view of the locking assembly showing the locked position in full line and the open position in phantom;

FIG. 5 is a side elevation view of the upper part of the livestock feeder showing the locking assembly with the feed hatch partially open.

DESCRIPTION OF THE INVENTION

A livestock feeder, in accordance with our invention, comprises a floor, a flange extending about the periphery of the floor, and a cylindrical hopper positioned substantially in the center of the floor which forms a trough with the peripheral flange to accommodate feed. An inverted cone-shaped member is positioned within the hopper to direct the flow of feed downwardly and outwardly to the trough. Positioned above the trough, and circumferentially about the outside of the hopper, is a canopy to shelter the livestock and feed from the elements. The top of the hopper is covered with a detachably connected roof which permits access to the hopper for cleaning the interior. The roof is provided with a hatch through which feed and other animal food may be added to the hopper. A hatch cover is positioned over the hatch with locking means attached thereto for lifting and locking the hatch cover from a remote location. Positioned circumferentially about the base of the hopper are means for controlling the rate of feed from the hopper into the trough, so that feed stored in the hopper will be directed downwardly and outwardly to the trough to permit livestock to feed unattended from the trough in a sheltered position.

The livestock feeder can also be supplied with means for moving the feeder to various parts of the range or acreage. Such means, for example, include an under carriage supplied with runners to form a sled which is positioned beneath the feeder.

PREFERRED EMBODIMENT

Figure 1:
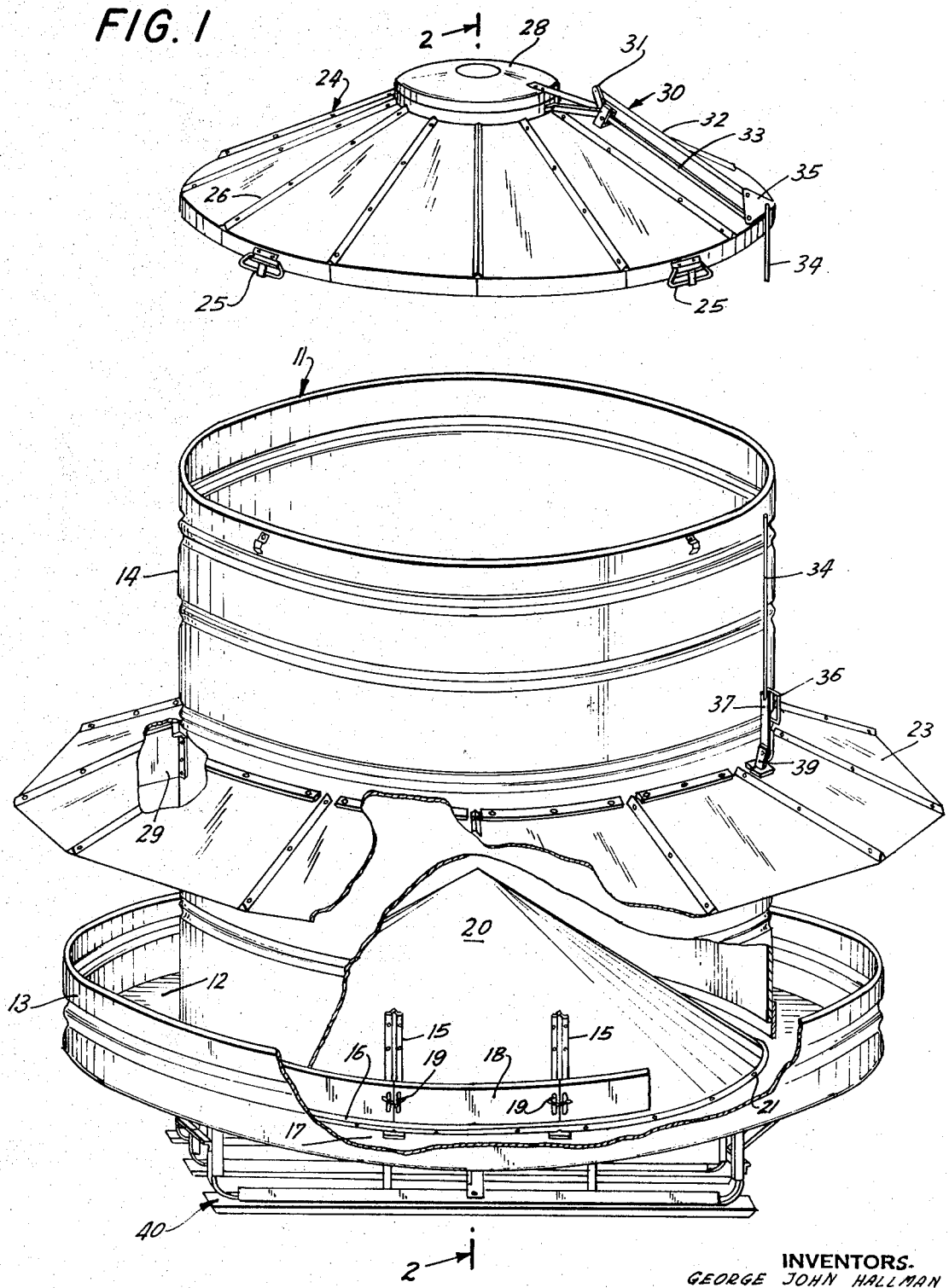
FIG. 1 is an exploded perspective view of the livestock feeder partly in cutaway.
Figure 2:
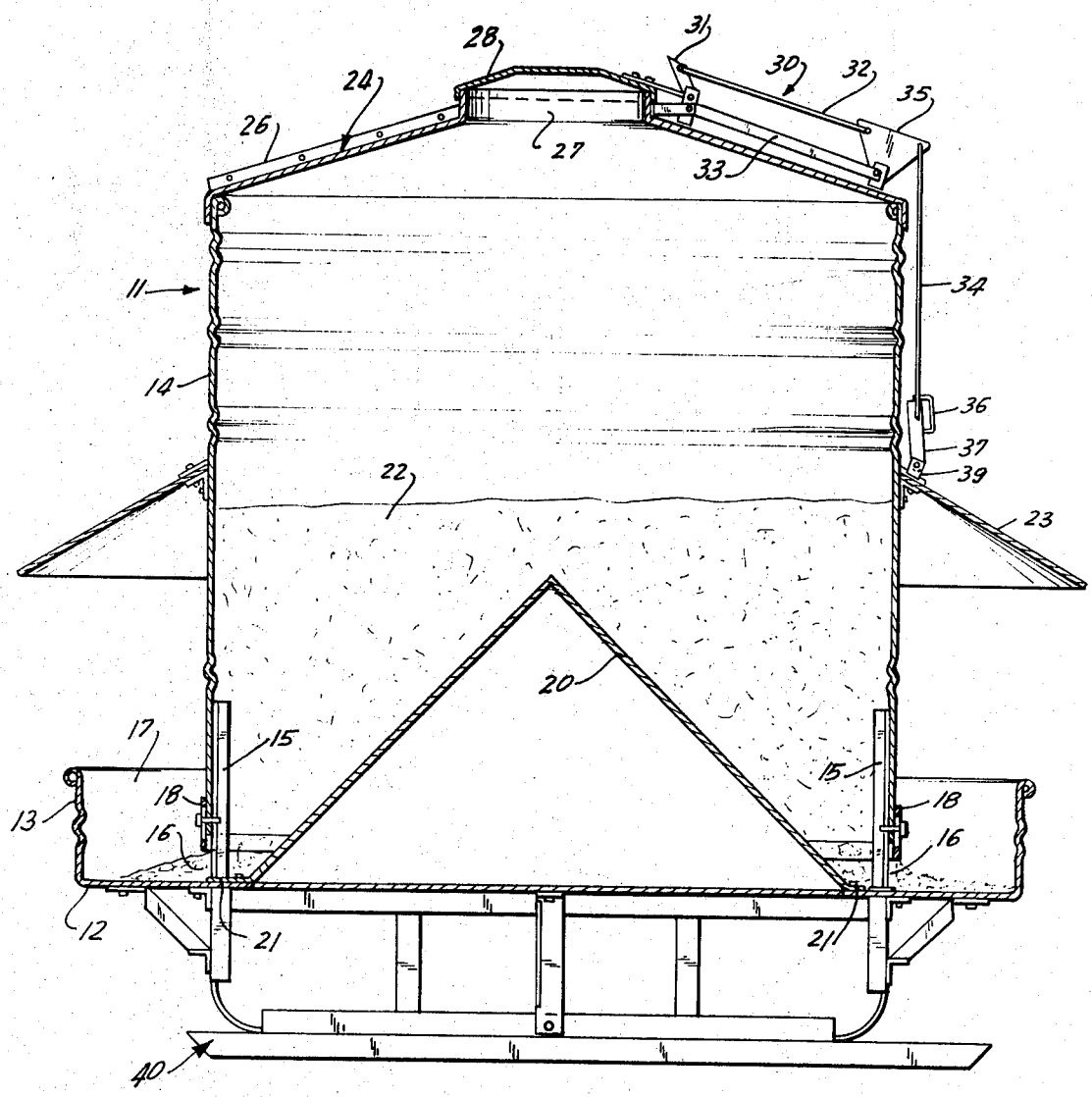
FIG. 2 is a sectional view of the livestock feeder taken along the line 2—2.

Referring now to the drawings, FIGS. 1 and 2 show a sled 40 supporting a livestock feeder 11 which includes a base or floor 12 which is provided with an outer wall or flange 13. A cylindrical hopper 14 is positioned a short distance above the floor 12 by means of brackets 15 leaving an opening 16 between the base of the hopper and the floor through which the feed emerges into the trough 17. Baffles 18 are adjustably connected to brackets 15 and control the entry and rate of flow of feed from the hopper into the trough. The baffles can be moved upwardly or downwardly on slots 19 so that the area of the opening at the base of the hopper can be varied depending on the amount of feed desired to fill the trough.

Positioned within the hopper is an inverted cone-shaped member 20 which is connected to the floor with bolts 21. This cone-shaped member causes the feed 22 stored in the hopper to flow downwardly and outwardly toward the opening 16 at the base of the hopper. It should be noticed that regardless of the amount of feed stored in the hopper, the feed will always be directed downwardly toward opening 16.

A downwardly sloping canopy 23 is positioned above the trough and circumferentially about the outside of the hopper on supports 29 to provide livestock with a sheltered position when they are feeding from the trough. In addition, canopy 23 protects the exposed feed in the trough from rain, wind, snow, ice and moisture. The slope of the canopy permits rain to be directed downwardly away from the feeding trough during inclement weather. Over the top of hopper 14 is a roof 24 detachably connected with latches 25 positioned at various points about the periphery. Roof 24 is also designed in a downwardly sloping manner supported with ribs 26 to direct rainfall outwardly toward the surrounding canopy below. In addition, roof 24 is provided with a hatch 27 adapted to receive a hatch cover 28 through which feed may be supplied to replenish the hopper 14.

Hatch locking assembly 30 consists of a hatch connector 31, connecting members 32, 33 and 34, rotatable connector 35, handle 36, and pivot bar 37 rotatably connected to bracket 39, is used to open and close the hatch cover 28 from a remote location at the side of hopper 14 as shown in FIG. 5. FIGS. 3 and 4 show a close up view of part of the locking assembly consisting of pivot bar 37, connecting member 34 and locking pin 38. FIG. 3 is a side elevation of the locking assembly in locked position (shown in full line) and open position (shown in phantom). In the locked position locking pin 38 is securely located behind connecting member 34 so that the assembly cannot be opened and the hatch cover lifted by merely pulling the handle forward in the direction of the arrow. FIG. 4 is a front elevation view of the locking assembly in the locked position shown in full line and with the locking pin 38 disengaged from connecting member 34 shown in phantom when the handle 36 is moved in the direction of the arrow.

Figure 6:
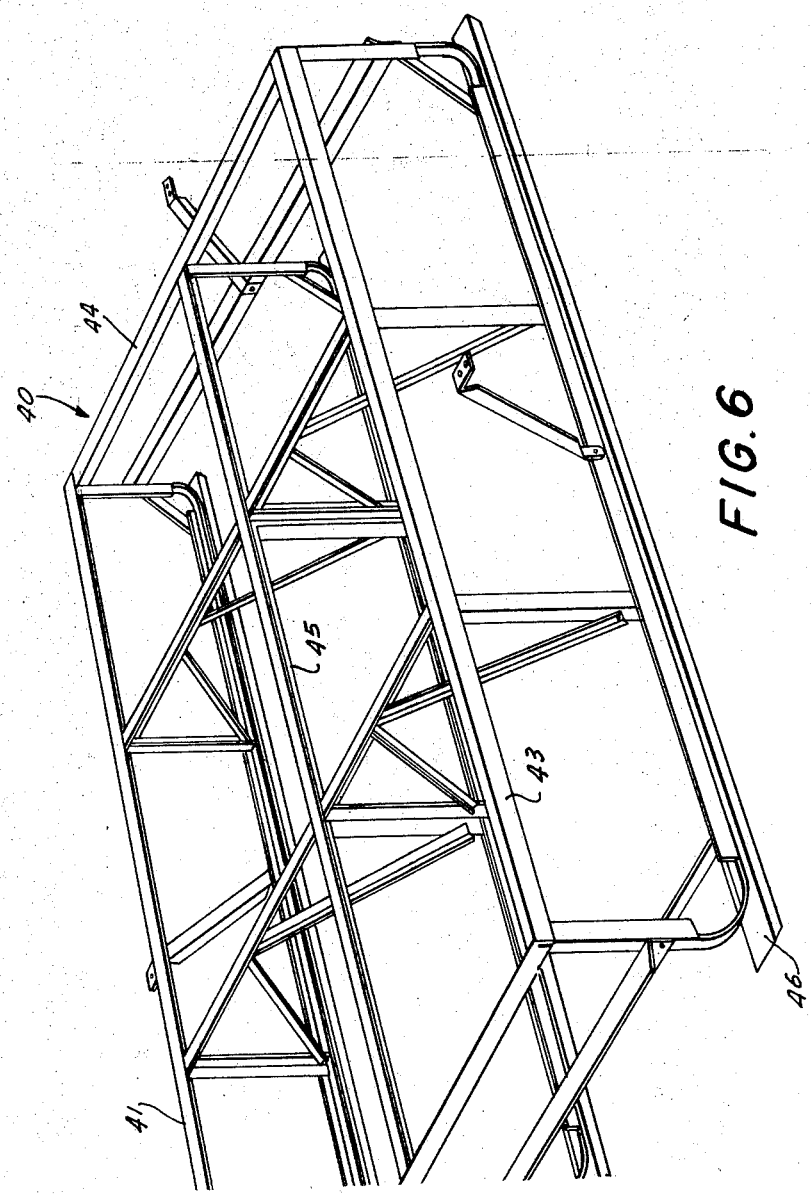
FIG. 6 is a perspective view of the sled.

FIG. 6 shows a sled 40 with the livestock feeder removed. The sled consists of supporting members 41, 42, 43, 44 and 45 structurally interconnected to runners 46, 47 and 48 which permit the livestock feeder to be moved from one part of the range to another without risk of damaging the feeder using a tractor or wheeled vehicle. The livestock feeder 11 can be bolted to sled 40 at several points to securely position the feeder over the sled. The sled renders the feeder mobile and permits easy movement of the feeder from place to place whether empty or full.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and appended claims.

We claim:
1. A livestock feeder which comprises:
 a. a floor;
 b. a flange extending about the periphery of the floor;
 c. a hopper attached to the floor and forming a trough with the peripheral flange to accommodate the feed;
 d. an inverted cone-shaped member positioned within the hopper to direct the flow of feed downwardly and outwardly into the trough;
 e. a canopy positioned above the trough and about the outside of the hopper to shelter the livestock and feed from the elements;
 f. a roof positioned over the hopper and detachably connected thereto to permit access to the hopper for cleaning the interior, said roof provided with a feed hatch through which feed and other animal food may be added to the hopper;
 g. a hatch cover to shield the interior of the hopper;
 h. means for lifting the hatch cover from a remote location including an assembly for locking the hatch cover in the closed position and a handle positioned immediately above the canopy and a connecting member extending vertically in the direction of the hatch cover, the locking assembly including a locking pin protruding from the handle for insertion behind the connecting member to prevent forward movement of the handle and lock the hatch cover in the closed position; and
 i. means positioned about the base of the hopper for controlling the rate of feed from the hopper into the trough, whereby feed stored in the hopper will be directed downwardly and outwardly into the trough to permit livestock to feed unattended from the trough in a sheltered position.

2. A livestock feeder in accordance with claim 1 wherein the hopper is cylindrical and positioned somewhat above the floor to define a feed opening between the interior of the hopper and the trough and the means for controlling the rate of feed through the feed opening comprise a plurality of baffles circumferentially located about the base of the hopper.

3. A livestock feeder in accordance with claim 2 wherein the baffles are adjustably mounted for controlling the amount of feed entering the trough through the feed opening.

4. A livestock feeder in accordance with claim 3 including a sled positioned beneath the floor to render the feeder mobile.

5. A livestock feeder which comprises:
 a. a circular floor;
 b. a cylindrical flange extending essentially vertically upwardly and about the periphery of the floor;
 c. a cylindrical hopper extending essentially vertically and attached to the floor and forming a trough with the peripheral flange to accommodate the feed;
 d. a cone-shaped member positioned within the hopper to direct the flow of feed downwardly and outwardly into the trough;
 e. a canopy positioned above the trough and about the outside of the hopper to shelter the livestock and feed from the elements;
 f. a truncated cone-shaped roof positioned over the hopper and detachably connected thereto to permit access to the hopper for cleaning the interior, said roof provided with a concentrically located feed hatch at the top thereof through which feed and other animal food may be added to the hopper;
 g. a concentric hatch cover adapted to extend from an open position to a closed position covering the feed hatch to shield the interior of the hopper;
 h. means for lifting the hatch cover from a remote location comprising parts thereof on the roof and coupled with the hatch cover and other parts extending downwardly from the roof on the exterior side of the hopper and adapted to be gripped to shift the cover between its open and closed position; and
 i. means positioned about the base of the hopper for controlling the rate of feed from the hopper into the trough, whereby feed stored in the hopper will be directed downwardly and outwardly into the trough to permit livestock to feed unattended from the trough in a sheltered position.

6. A livestock feeder in accordance with claim 5 including means positioned beneath the floor of the feeder to render the feeder mobile.

7. A livestock feeder in accordance with claim 6 wherein the means for rendering the cattle feeder mobile comprise a sled.

8. A livestock feeder in accordance with claim 5 wherein the means for lifting the hatch cover includes an assembly for locking the hatch cover in the closed position.

9. A livestock feeder in accordance with claim 8 wherein the means for lifting the hatch cover include a handle positioned immediately above the canopy and a connecting member extending vertically in the direction of the hatch cover.

10. A livestock feeder in accordance with claim 9 wherein the locking assembly includes a locking pin protruding from the handle for insertion behind the connecting member to prevent forward movement of the handle and lock the hatch cover in the closed position.